(12) United States Patent
Wang et al.

(10) Patent No.: US 10,477,631 B2
(45) Date of Patent: Nov. 12, 2019

(54) POWER CIRCUIT APPLIED IN LED LOAD

(71) Applicant: DELTA ELECTRONICS, INC., Taoyuan Hsien (CN)

(72) Inventors: Xiaobo Wang, Taoyuan Hsien (CN); Xinghua Zhang, Taoyuan Hsien (CN)

(73) Assignee: DELTA ELECTRONICS, INC., Taoyuan (TW)

( * ) Notice: Subject to any disclaimer, the term of this patent is extended or adjusted under 35 U.S.C. 154(b) by 86 days.

(21) Appl. No.: 14/971,002

(22) Filed: Dec. 16, 2015

(65) Prior Publication Data
US 2016/0234894 A1 Aug. 11, 2016

(30) Foreign Application Priority Data
Feb. 5, 2015 (CN) .......................... 2015 1 0060841

(51) Int. Cl.
| H05B 33/08 | (2006.01) |
| H02M 1/08 | (2006.01) |
| H02M 3/335 | (2006.01) |
| H02M 1/32 | (2007.01) |
| H02M 3/04 | (2006.01) |

(Continued)

(52) U.S. Cl.
CPC .......... *H05B 33/0815* (2013.01); *H02M 1/32* (2013.01); *H02M 1/42* (2013.01); *H02M 3/04* (2013.01); *H02M 7/04* (2013.01)

(58) Field of Classification Search
CPC . H05B 33/0815; H05B 33/0845; H02M 1/32; H02M 1/42; H02M 3/04; H02M 3/33507; H02M 7/04; H02M 2001/325

USPC ......................................................... 315/246
See application file for complete search history.

(56) References Cited

U.S. PATENT DOCUMENTS

| 6,586,890 B2 | 7/2003 | Min et al. |
| 6,870,325 B2 | 3/2005 | Bushell et al. |
| 7,084,571 B2 | 8/2006 | Ito et al. |

(Continued)

FOREIGN PATENT DOCUMENTS

| CN | 101873747 A | 10/2010 |
| CN | 102118106 A | 7/2011 |

(Continued)

OTHER PUBLICATIONS

The 1st OA issued in the counterpart CN application dated Dec. 4, 2017, by the SIPO.

*Primary Examiner* — Stephen G Sherman
(74) *Attorney, Agent, or Firm* — YunlingRen

(57) ABSTRACT

The present application discloses a power circuit applied in a LED load. The power circuit includes: a power converter configured to convert an input voltage into a DC output voltage; a first feedback module configured to detect the output voltage and an output current of the power converter, and to output a first feedback signal; a second feedback module configured to detect the output voltage and the output current of the power converter, and to output a second feedback signal, the second feedback module and the first feedback module being independent to each other; and a control circuit configured to output a control circuit according to the first feedback signal or the second feedback signal to control the power converter via the control signal so as to make the output power of the power converter smaller than a predetermined power threshold.

9 Claims, 8 Drawing Sheets

(51) Int. Cl.
*H02M 7/04* (2006.01)
*H02M 1/42* (2007.01)

(56) References Cited

U.S. PATENT DOCUMENTS

| | | | |
|---|---|---|---|
| 7,105,945 B2 | 9/2006 | Shiotsu et al. | |
| 7,244,036 B2 | 7/2007 | Murakami et al. | |
| 7,327,051 B2 | 2/2008 | Ito et al. | |
| 7,352,135 B2 | 4/2008 | Shiotsu et al. | |
| 7,482,765 B2 | 1/2009 | Ito et al. | |
| 7,642,725 B2 | 1/2010 | Cusinato et al. | |
| 7,932,681 B2 | 4/2011 | Konno et al. | |
| 8,587,203 B2 | 11/2013 | Chen et al. | |
| 8,653,736 B2 | 2/2014 | Chen et al. | |
| 2006/0186827 A1 | 8/2006 | Ragonesi et al. | |
| 2006/0238466 A1 | 10/2006 | Chen et al. | |
| 2007/0069664 A1 | 3/2007 | Robinson et al. | |
| 2009/0009088 A1 | 1/2009 | Ito et al. | |
| 2012/0280637 A1 | 11/2012 | Tikkanen et al. | |
| 2012/0314463 A1* | 12/2012 | Chen | H02M 3/00 363/50 |
| 2013/0049462 A1 | 2/2013 | Chen et al. | |
| 2013/0063047 A1* | 3/2013 | Veskovic | H05B 33/0815 315/307 |
| 2014/0152183 A1* | 6/2014 | Kim | H05B 33/0809 315/155 |
| 2014/0197739 A1* | 7/2014 | Lu | H05B 33/0815 315/122 |
| 2015/0015143 A1* | 1/2015 | Inada | H05B 33/0815 315/77 |
| 2016/0057824 A1* | 2/2016 | Hu | H05B 33/0815 315/210 |

FOREIGN PATENT DOCUMENTS

| | | |
|---|---|---|
| CN | 102487215 A | 6/2012 |
| CN | 103051206 A | 4/2013 |
| CN | 103428943 A | 12/2013 |
| CN | 103596343 A | 2/2014 |
| CN | 103841702 A | 6/2014 |
| CN | 103857149 A | 6/2014 |
| TW | 201431233 A | 8/2014 |

\* cited by examiner

POWER CIRCUIT APPLIED IN LED LOAD

CROSS REFERENCE TO RELATED APPLICATION

This application is based upon and claims priority to Chinese Patent Application No. 201510060841.6, filed on Feb. 5, 2015, the entire contents of which are incorporated herein by reference.

TECHNICAL FIELD

The present disclosure relates to the field of power supplies, and more particularly, to a power circuit applied in a LED load.

BACKGROUND

Some power supplies used in America are restrained by safety requirements issued by Underwriters Laboratory, and particularly restrained by a UL 1310 Class 2 Standard. In particular, the UL1310 Standard limits an output voltage, an output current and an output power of a power supply that is classified into Class 2, and these limitations shall be strictly met even in the case of single component fault. Taking the output power for example, the power limitation about the UL1310 Class 2 power supply is that each output channel shall not be over 100 W; these channels/outputs may be configured to drive a single light source, such as a solid-state light source (for example, a LED or an OLED), a gas discharge lamp or an incandescent lamp, and the like.

One conventional design scheme is that two voltage converting stages are employed in a power circuit, i.e., a front end stage and an output stage. For example, the front end stage receives a Direct Current (DC) input voltage or an Alternating Current (AC) input voltage, and converts the input voltage into a regulated intermediate voltage. The output stage is coupled to an output terminal of the front end stage, receives the intermediate voltage and uses a buck DC/DC converter to provide a lower desired DC output voltage. However, the power output limitation of the power circuit is mainly implemented through limiting the peak of the switching current of the DC/DC converter. In order to ensure that a power protection point cannot be triggered by mistake under a rated output, the protection can be really triggered in most cases when the output power exceeds the rated power by a great amount; therefore, the control accuracy of the output power is relatively low.

SUMMARY

According to one aspect of the present disclosure, it is provided a power circuit applied in a LED load. The power circuit includes:

a power converter configured to receive an input voltage and convert the input voltage into a DC output voltage;

a first feedback module electrically coupled to an output terminal of the power converter, and configured to detect the output voltage and an output current of the power converter and to output a first feedback signal;

a second feedback module electrically coupled to the output terminal of the power converter, and configured to detect the output voltage and the output current of the power converter and to output a second feedback signal, wherein the second feedback module and the first feedback module are independent to each other; and a control circuit electrically coupled to the first feedback module, the second feedback module and the power converter, wherein the control circuit is configured to output a control signal according to the first feedback signal or the second feedback signal, so as to control the power converter on the basis of the control signal and make an output power of the power converter smaller than a predetermined power threshold.

The above power circuit includes two feedback modules, i.e., the first feedback module and the second feedback module which are independent to each other. That is to say, each of the two feedback modules can independently detect the output voltage and the output current of the power converter and output a feedback signal. Thus, two feedback loops which are independent to each other are accordingly formed: the power converter, the first feedback module and the control circuit form a feedback loop, and the power converter, the second feedback module and the control circuit form another feedback loop. In this way, even if a single component fault leads to failure of a certain feedback loop, the output power of the power circuit can still be controlled through another feedback loop, so that the output power of the power circuit can still be limited to be smaller than or even close to the predetermined power threshold.

DETAILED DESCRIPTION

Figure 1:
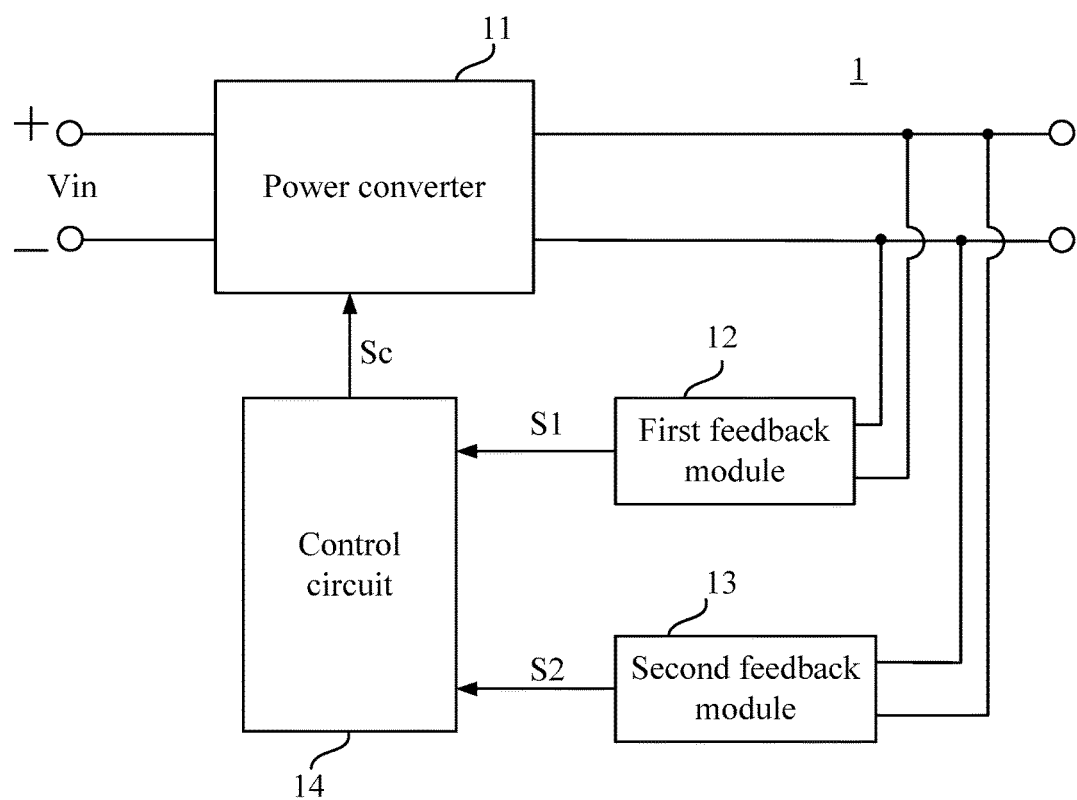
FIG. 1 schematically illustrates a block diagram of a power circuit applied in a LED load according to an exemplary embodiment of the present disclosure.

FIG. 1 schematically illustrates a block diagram of a power circuit applied in an LED load according to an exemplary embodiment of the present disclosure. The power circuit 1 applied in an LED load includes a power converter 11, a first feedback module 12, a second feedback module 13 and a control circuit 14.

The power converter 11 is configured to receive an input voltage Vin, and to convert the input voltage Vin into a DC output voltage. For example, the power converter 11 may be an AC/DC converter or a DC/DC converter.

The first feedback module 12 is electrically coupled to an output terminal of the power converter 11, and is configured to detect the output voltage and an output current of the power converter 11, and to output a first feedback signal S1.

The second feedback module 13 is electrically coupled to the output terminal of the power converter 11, and is configured to detect the output voltage and the output current of the power converter 11, and to output a second feedback signal S2.

The first feedback signal S1 and the second feedback signal S2 indicate the magnitude of the output voltage and the output current of the power converter 11.

The control circuit 14 is electrically coupled to the first feedback module 12, the second feedback module 13 and the power converter 11, and is configured to output a control signal Sc according to the first feedback signal S1 from the first feedback module 12 or the second feedback signal S2 from the second feedback module 13 to control the power converter 11 via the control signal Sc so as to make an output power of the power converter 11 smaller than a predetermined power threshold. For example, the power threshold is selected according to UL1310 Class 2 Standard. For example, the power threshold may be 100 W as provided in the Class 2 Standard.

For example, when the first feedback signal S1 or the second feedback signal S2 indicates that the output voltage or the output current of the power converter exceeds related limitations, then the control circuit 14 may output the control signal Sc, and the control signal may be used to control the power converter 11 to make the output power of the power converter smaller than the predetermined power threshold.

The power circuit includes two feedback modules, i.e., the first feedback module 12 and the second feedback module 13 which are independent to each other. That is to say, each of the two feedback modules can independently detect the output voltage and the output current of the power converter 11 and output a feedback signal. Thus, two feedback loops which are independent to each other are accordingly formed: the power converter 11, the first feedback module 12 and the control circuit 14 form a feedback loop, and the power converter 11, the second feedback module 13 and the control circuit 14 form another feedback loop. In this way, even if a single component fault leads to failure of a certain feedback loop, the output power of the power circuit can still be controlled through another feedback loop, so that the output power of the power circuit can still be limited to be smaller than the predetermined power threshold.

Figure 2:
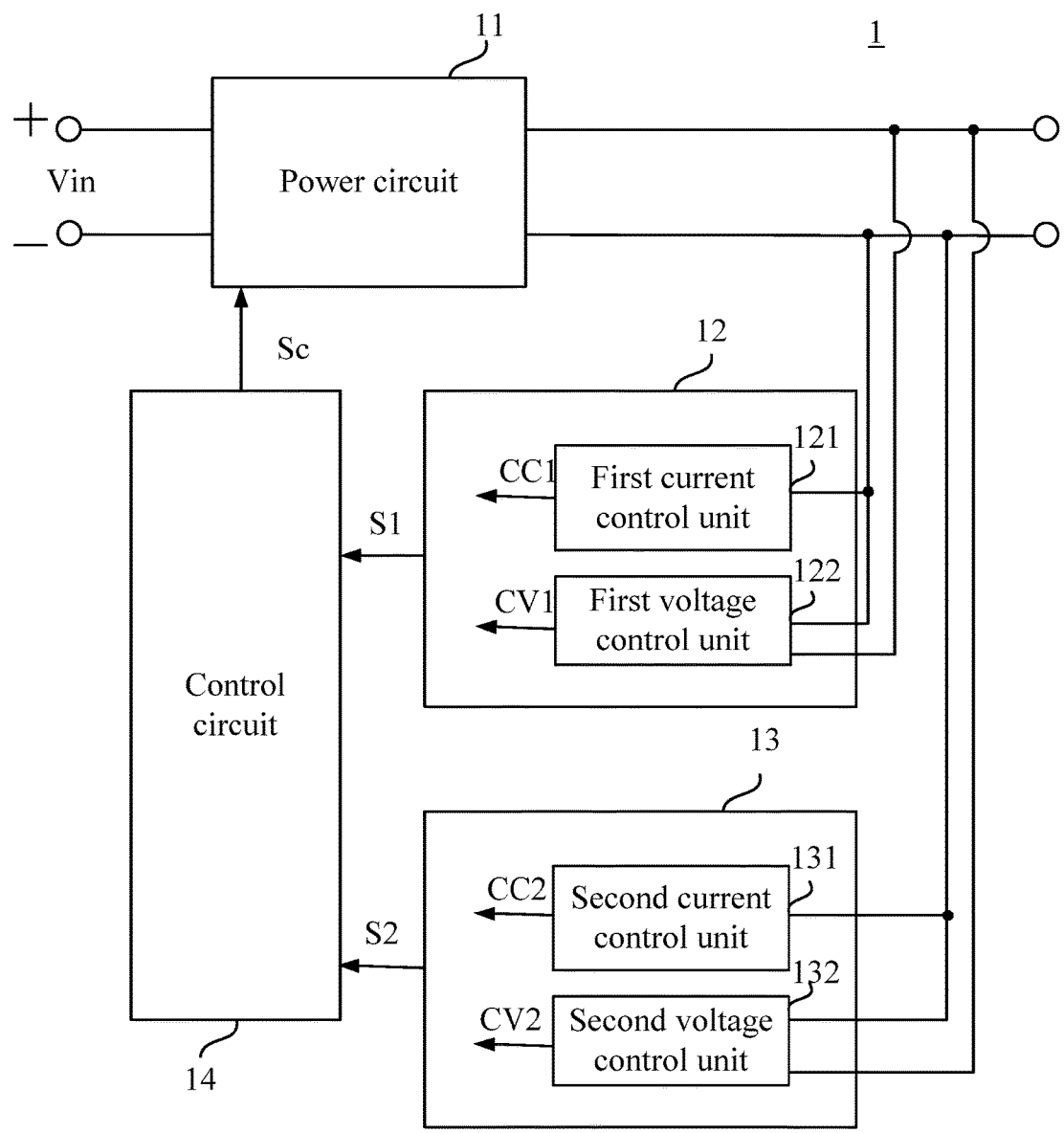
FIG. 2 schematically illustrates a block diagram of a power circuit applied in a LED load according to another exemplary embodiment of the present disclosure.

FIG. 2 schematically illustrates a block diagram of a power circuit applied in an LED load according to another exemplary embodiment of the present disclosure. In the embodiment, the first feedback module 12 includes a first current control unit 121 and a first voltage control unit 122. The first current control unit 121 is configured to detect the output current of the power converter 11, to compare the output current with a preset output current reference, and to output a current control signal CC1. The preset output current reference may be a preset value. The output current control signal CC1 is configured to indicate whether the detected output current is greater than the preset current reference or smaller than or equal to the preset current reference. The second voltage control unit 122 is configured to detect the output voltage of the power converter 11, to compare the output voltage with a preset output voltage reference, and to output a voltage control signal CV1. The preset output voltage reference may be a preset value. The output voltage control signal CV1 is configured to indicate whether the detected output voltage is greater than the preset voltage reference or smaller than or equal to the preset voltage reference. In the embodiment, the first feedback module 12 outputs the first feedback signal S1 according to the current control signal CC1 and the voltage control signal CV1.

The second feedback module 13 includes a second current control unit 131 and a second voltage control unit 132. The second current control unit 131 is configured to detect the output current of the power converter 11, to compare the output current with a preset output current reference, and to output a current control signal CC2. The preset output current reference may be a preset value. The output current control signal CC2 is configured to indicate whether the detected output current is greater than the preset current reference or smaller than or equal to the preset current reference. The second voltage control unit 132 is configured to detect the output voltage of the power converter, to compare the output voltage with a preset output voltage reference, and to output a voltage control signal CV2. The preset output voltage reference may be a preset value. The output voltage control signal CV2 is configured to indicate whether the detected output voltage is greater than the preset voltage reference or smaller than or equal to the preset voltage reference. The second feedback module 13 outputs the second feedback signal S2 according to the current control signal CC2 and the voltage control signal CV2.

In the embodiment as shown in FIG. 2, the first feedback module 12 and the second feedback module 13 are independent to each other. Specifically, the first current control unit 121 and the first voltage control unit 122 in the first feedback module 12 and the second current control unit 131 and the second voltage control unit 132 in the second feedback module 13 are independent to each other. In this way, even if any single component fault in a feedback loops which the first feedback module 12 or the second feedback module 13 reside in leads to failure of a certain feedback loop, the detection of the output voltage and the output current and the controlling of the output power can still be completed by the other feedback loop.

According to one embodiment, the first current control unit 121 may be a CC (Constant Current) feedback unit or an OCP (Overcurrent Protection) unit, and the first voltage control unit 122 may be a CV (Constant Voltage) feedback unit or an OVP (Overvoltage Protection) unit. Similarly, the second current control unit 131 may be a constant current feedback unit or an overcurrent protection unit, and the second voltage control unit 132 may be a constant voltage feedback unit or an overvoltage protection unit.

Figure 3:
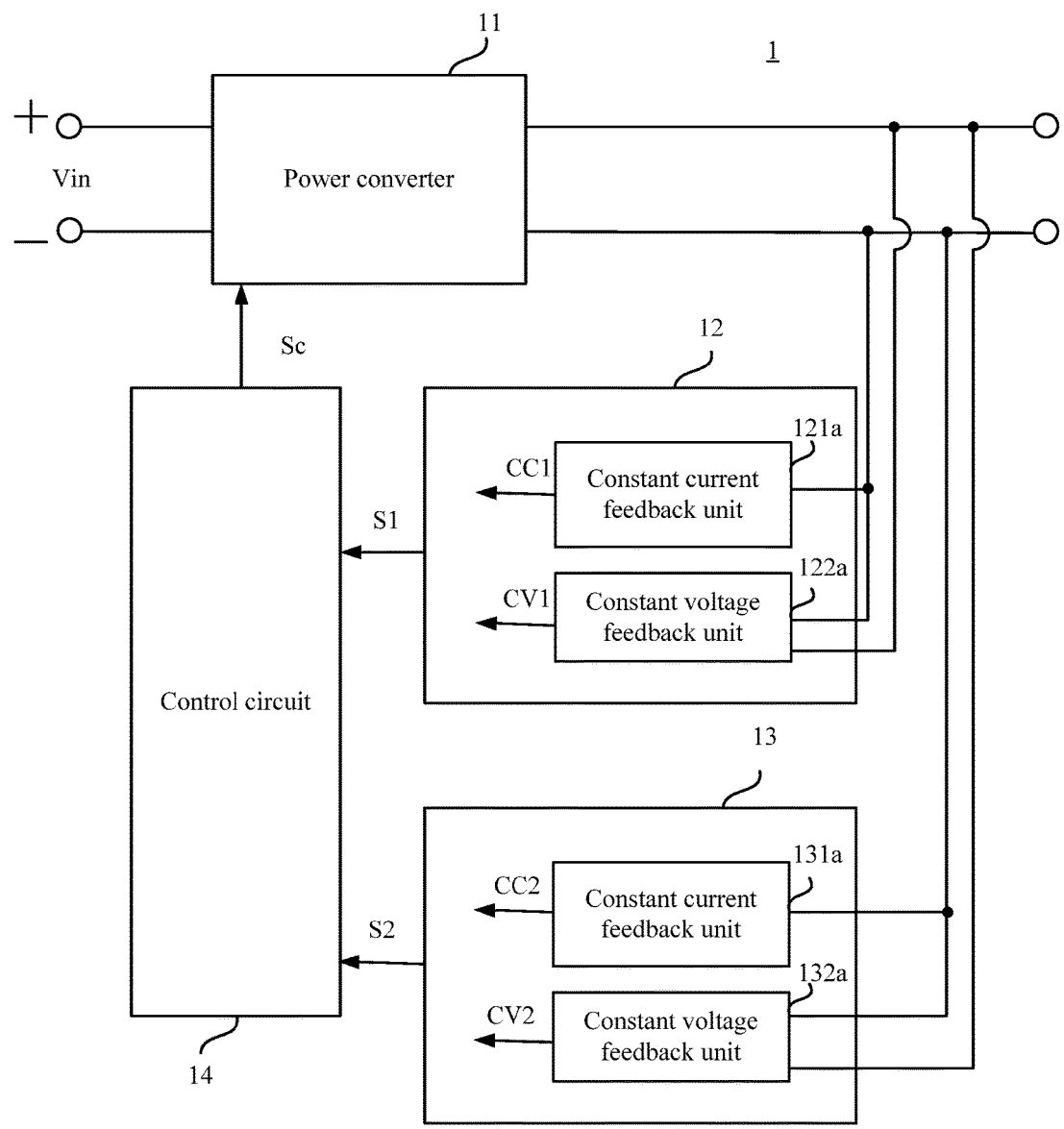
FIG. 3 schematically illustrates a block diagram of a power circuit applied in a LED load according to another exemplary embodiment of the present disclosure.

FIG. 3 schematically illustrates a block diagram of a power circuit applied in an LED load according to another exemplary embodiment of the present disclosure. In the embodiment, the first current control unit is a constant current feedback unit 121*a*, the first voltage control unit is a constant voltage feedback unit 122*a*, the second current control unit is a constant current feedback unit 131*a*, and the second voltage control unit is a constant voltage feedback unit 132*a*.

Figure 4:
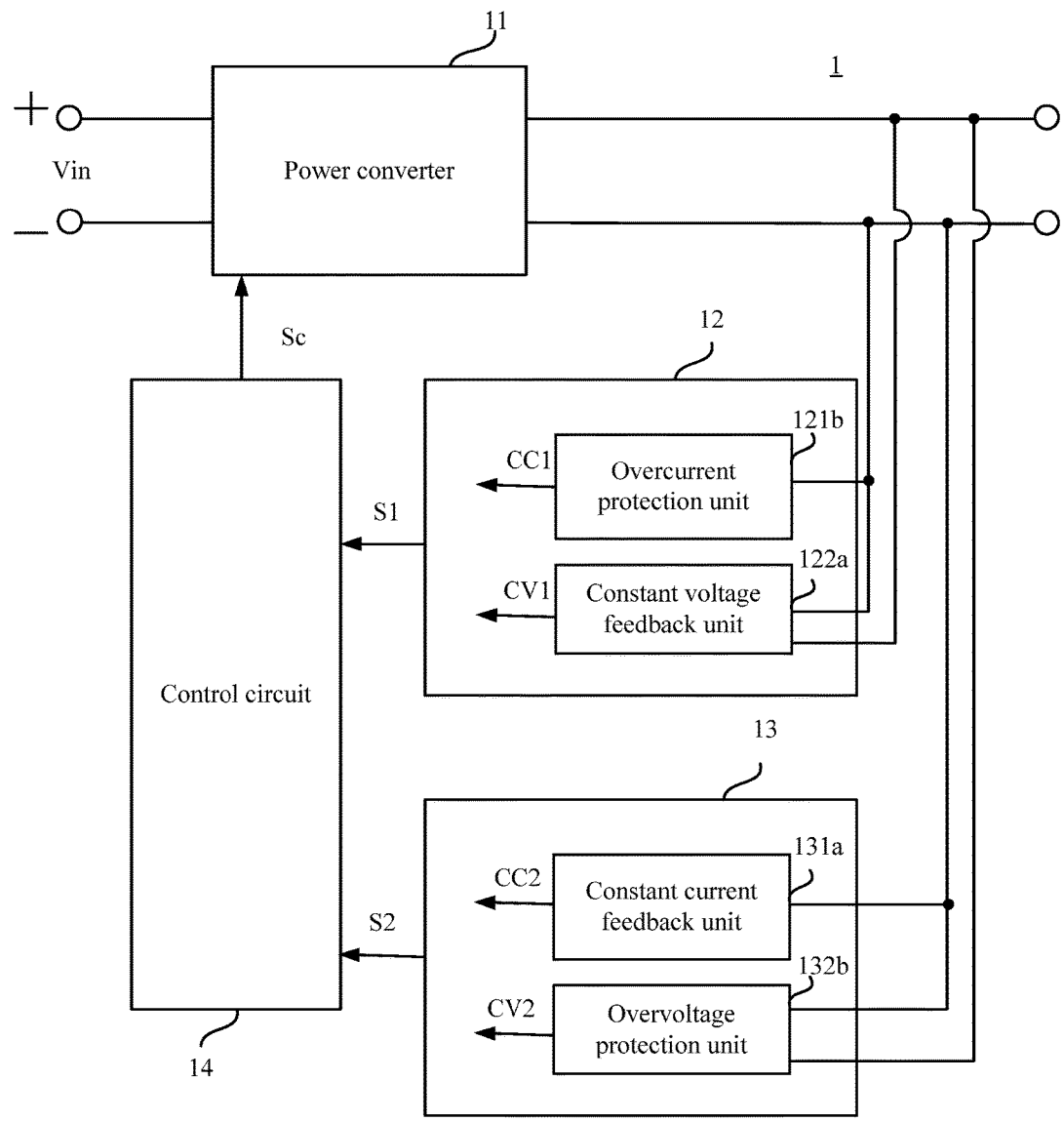
FIG. 4 schematically illustrates a block diagram of a power circuit applied in a LED load according to another exemplary embodiment of the present disclosure.

FIG. 4 schematically illustrates a block diagram of a power circuit applied in an LED load according to another exemplary embodiment of the present disclosure. In the embodiment, the first current control unit is an overcurrent protection unit 121*b*, the first voltage control unit is a constant voltage feedback unit 122*a*, the second current control unit is a constant current feedback unit 131*a*, and the second voltage control unit is an overvoltage protection unit 132*b*.

Figure 5:
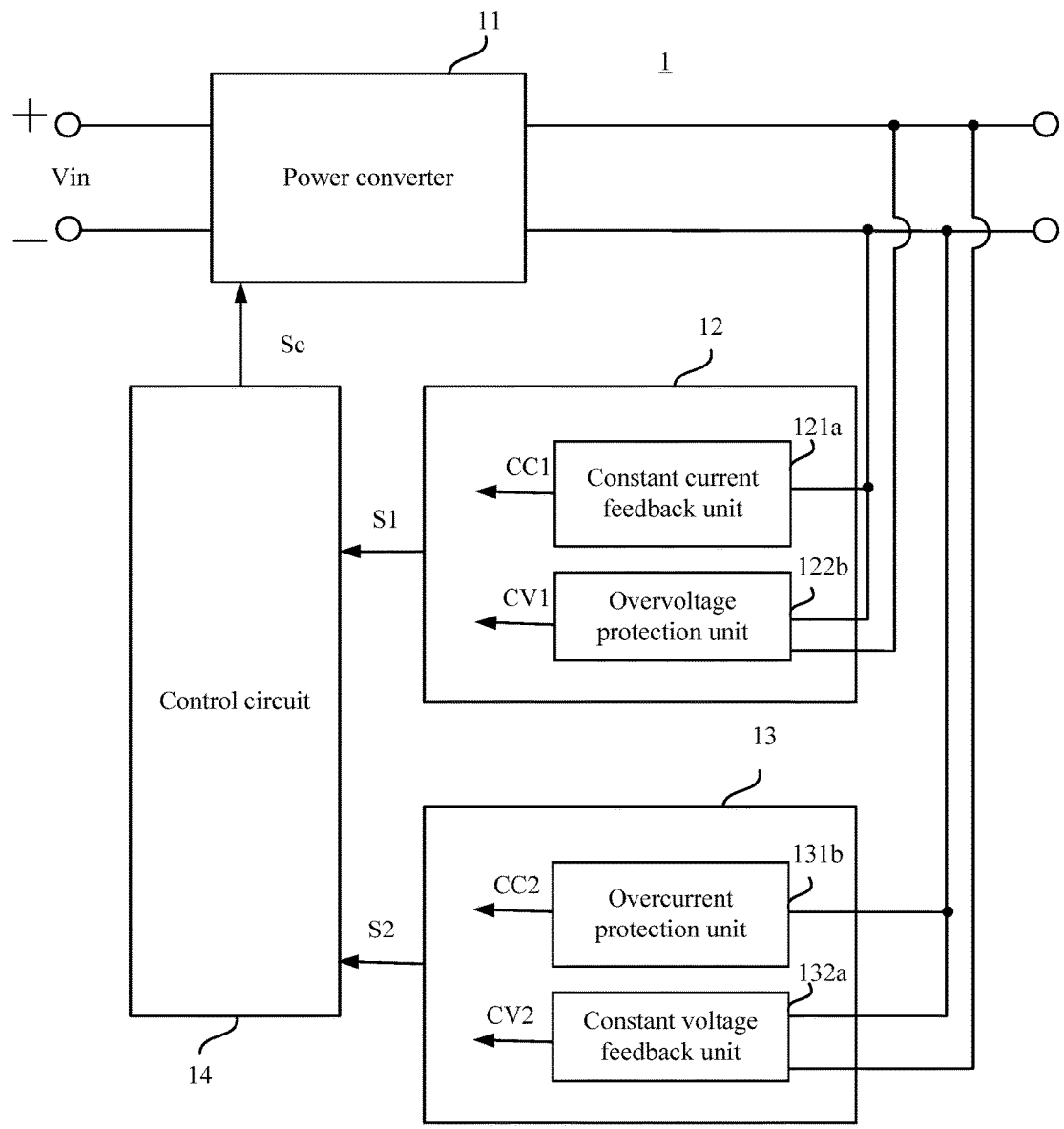
FIG. 5 schematically illustrates a block diagram of a power circuit applied in a LED load according to another exemplary embodiment of the present disclosure.

FIG. 5 schematically illustrates a block diagram of a power circuit applied in an LED load according to another exemplary embodiment of the present disclosure. In the embodiment, the first current control unit is a constant current feedback unit 121a, the first voltage control unit is an overvoltage protection unit 122b, the second current control unit is an overcurrent protection unit 131b, and the second voltage control unit is a constant voltage feedback unit 132a.

In the embodiments as shown in FIGS. 3 to 5, as to respective feedback loops, by employing a mode of constant current feedback plus constant voltage feedback (CC+CV), a mode of constant current feedback plus overvoltage protection (CC+OVP) or a mode of constant voltage feedback plus overcurrent protection (CV+OCP), the output voltage and the output current of the power converter are detected and controlled, so that the output power of the power converter can be controlled through another feedback loop in case that a single component fault in any one feedback loop leads to failure of a certain feedback loop. Consequently, the output voltage of the power converter is controlled to be smaller than a predetermined output power.

In the embodiment as shown in FIG. 3, it can be seen that two groups of constant current feedback loops (formed by two constant current feedback units, respectively, in combination with the control unit) and two groups of constant voltage feedback loops (formed by two constant voltage feedback units, respectively, in combination with the control unit) are actually included. However, during normal operations, only one group of constant current feedback loop and one group of constant current feedback loop work. This is because although the parameters of the elements in the two groups of feedback loops may be the same, the current reference or the voltage reference of one group of constant current feedback loop or constant voltage feedback loop (for example, the current reference or the voltage reference in the first feedback module 12) may be a little lower than the current reference or the voltage reference of the other group of constant current feedback loop or constant voltage feedback loop (for example, the current reference or the voltage reference in the second feedback module 13) due to fabrication errors of electronic devices. As such, the constant current feedback unit 131a and the constant voltage feedback unit 132b in the second feedback module 13 do work during normal operations. The constant current feedback unit 131a and the constant current feedback unit 131b in the second feedback module 13 work to limit the output voltage and the output current only when circuit devices in the first feedback module 12 cause the feedback loop unable to control the output voltage or the output current within a predetermined range.

Moreover, in the embodiment as shown in FIG. 3, the output current of the power converter 11 may be controlled through the first current control unit 121 or the second current control unit 131, and the output voltage of the power converter 11 may be controlled through the first voltage control unit 122 or the second voltage control unit 132. In this way, control accuracy can be ensured, and thereby the control accuracy of the output power of the power converter 11 can be guaranteed. The embodiment as shown in FIG. 3 can even be applied in an occasion where the rated output power is very close to 100 W. However, in the conventional power limitation solution, power limitation is implemented through limiting the peak of the switching current of the power converter. In order to ensure that a power protection point cannot be triggered by mistake under a rated output, the conventional solution triggers protection in most cases when the output power exceeds the rated power by a great amount; therefore, the control accuracy of the output power is poor.

Figure 6:
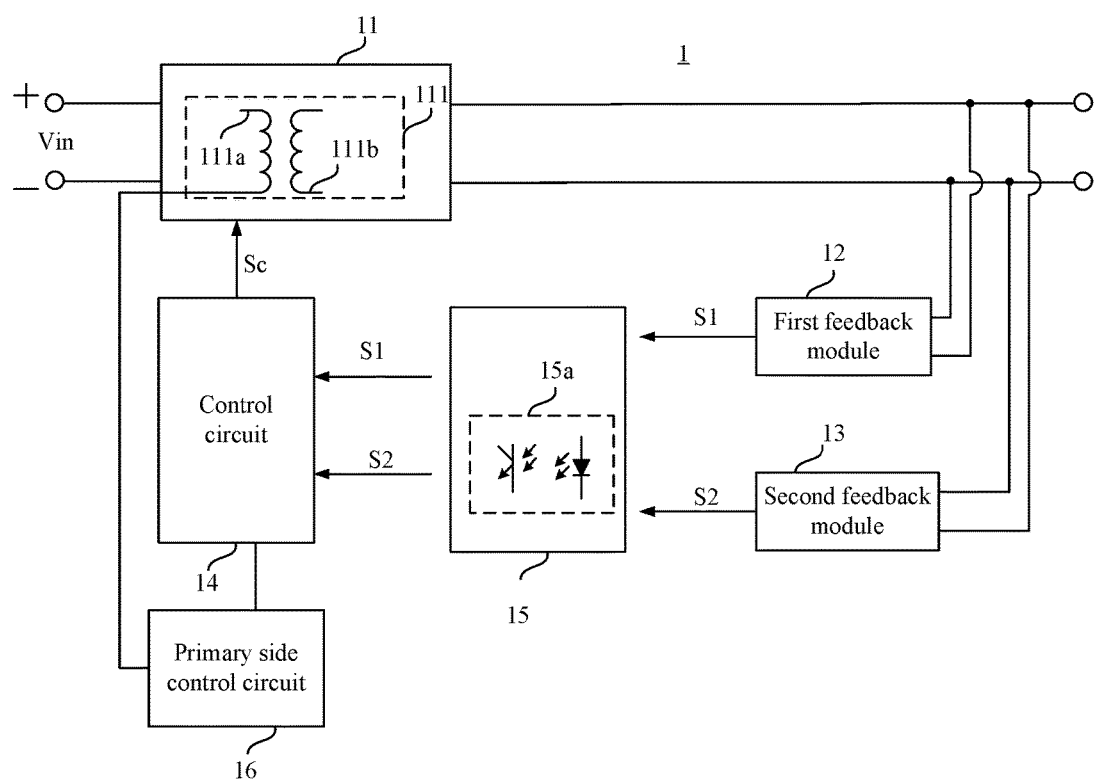
FIG. 6 schematically illustrates a block diagram of a power circuit applied in a LED load according to another exemplary embodiment of the present disclosure.

FIG. 6 schematically illustrates a block diagram of a power circuit applied in a LED load according to another exemplary embodiment of the present disclosure. The present embodiment differs from the embodiment as shown in FIG. 1 in that, the power circuit as shown in FIG. 6 further includes a signal transmission circuit 15 and a primary side control circuit 16. The signal transmission circuit 15 is electrically coupled to the first feedback module 12, the second feedback module 13 and the control circuit 14, and is configured to transmit the first feedback signal S1 from the first feedback module 12 or the second feedback signal S2 from the second feedback module 13 to the control circuit 14. When a fault occurs in the signal transmission circuit 15, the primary side control circuit 16 performs an overvoltage protection or an overcurrent protection on the power circuit 1.

According to one embodiment, the power converter 11 may include an isolation transformer 111. The isolation transformer 111 includes a primary side 111a and a secondary side 111b. The control circuit 14 may be disposed at the primary side 111a of the isolation transformer 111. The first feedback module 12 and the second feedback module 13 may be disposed at the secondary side 111b of the isolation transformer 111.

In the embodiment as shown in FIG. 5, the primary side control circuit 16 is electrically coupled to the primary side of the isolation transformer 111 in the power converter 11.

According to one embodiment, the primary side control circuit 16 may be a primary side overcurrent protection circuit or a primary side overvoltage protection circuit. The signal transmission circuit 15 may be an optical coupling device, for example, the signal transmission circuit may be an optocoupler 15a.

In the embodiment as shown in FIG. 6, the first feedback module 12 and the second feedback module 13 share one signal transmission circuit 15 to transmit the signal S1 or S2, and perform control in corporation with coordination with the primary side control circuit 16. In this way, in case that both the feedback loops formed by the first feedback module 12 and the second feedback module 13 are disabled due to a failure of the signal transmission circuit 15, an overvoltage protection or an overcurrent protection may be performed through the primary side control circuit 16, thereby limiting the output power of the power circuit 1.

Figure 7:
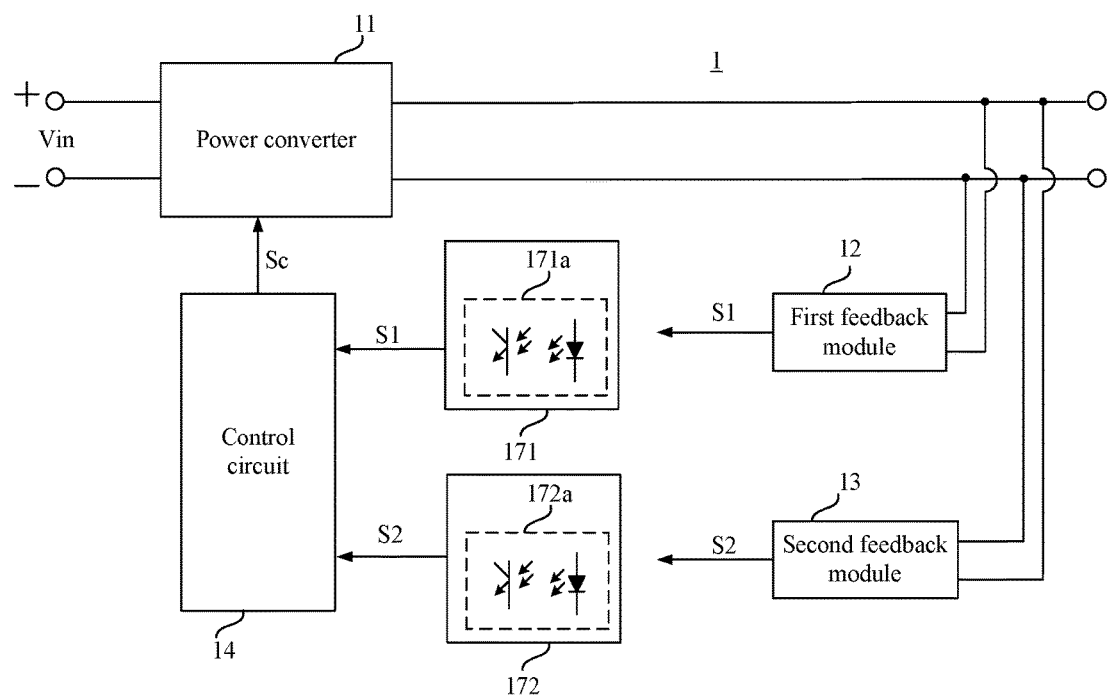
FIG. 7 schematically illustrates a block diagram of a power circuit applied in a LED load according to another exemplary embodiment of the present disclosure.

FIG. 7 schematically illustrates a block diagram of a power circuit applied in an LED load according to another exemplary embodiment of the present disclosure. The present embodiment differs from the embodiment as shown in FIG. 1 in that, the power circuit in FIG. 7 further includes a first signal transmission circuit 171 and a second signal transmission circuit 172.

The first signal transmission circuit 171 and the second signal transmission circuit 172 are independent to each other. The first signal transmission circuit 171 is electrically coupled to the first feedback module 12, and is configured to transmit the first feedback signal S1 from the first feedback module 12 to the control circuit 14. The second signal transmission circuit 172 is electrically coupled to the second feedback module 13, and is configured to transmit the second feedback signal S2 from the second feedback module 13 to the control circuit 14.

According to one embodiment, both the first signal transmission circuit 171 and the second signal transmission circuit 172 can be optical coupling devices, for example, the optocoupler 171a and 172a.

In the embodiment as shown in FIG. 7, the feedback signals S1 and S2 from the first feedback module 12 and the first feedback module 12 are transmitted through two signal transmission circuits 171 and 172, respectively. That is to say, one feedback loop is formed by the first feedback module 12, the first signal transmission circuit 171 and the control circuit 14, and another feedback loop is formed by the second feedback module 13, the second signal transmission circuit 172 and the control circuit 14. As such, when a component fault in any one feedback loop leads to failure of the feedback loop, the output power of the power circuit can still be detected and controlled through another feedback loop, so that the output power of the power circuit is controlled to be smaller than the predetermined power threshold.

Figure 8:
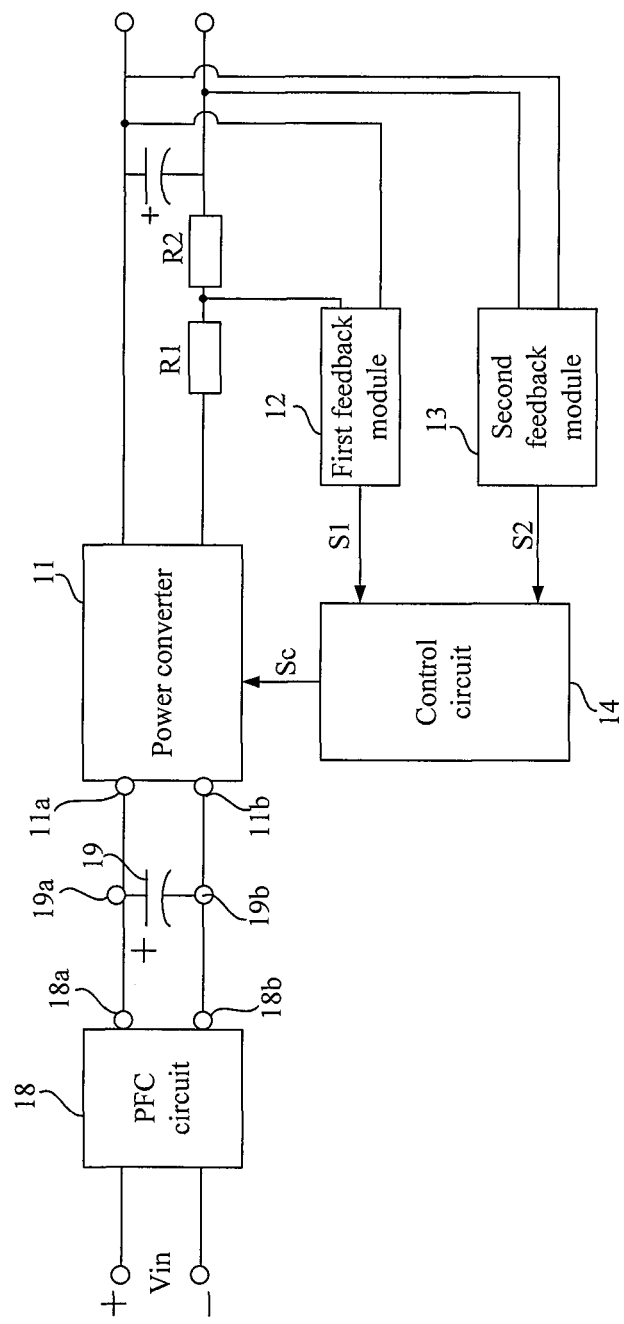
FIG. 8 schematically illustrates a block diagram of a power circuit applied in a LED load according to another exemplary embodiment of the present disclosure.

FIG. 8 schematically illustrates a block diagram of a power circuit applied in an LED load according to another exemplary embodiment of the present disclosure. The power circuit 1 further includes a power factor correction (PFC) circuit 18 and a bus capacitor 19. The PFC circuit 18 is configured to receive an AC voltage, and to convert the AC voltage into an intermediate voltage. The bus capacitor 19 is disposed between output terminals 18*a* and 18*b* of the PFC circuit 18 and input terminals 11*a* and 11*b* of the power converter 11. Specifically, one terminal 19*a* of the bus capacitor 19 is connected with the output terminal 18*a* of the PFC circuit 18 and the input terminal 11*a* of the power converter 11, and the other terminal 19*b* of the bus capacitor 19 is connected with the output terminal 18*b* of the PFC circuit 18 and the input terminal 11*b* of the power converter 11. The bus capacitor 19 is configured to provide the input voltage inputted to the power converter 11 according to the intermediate voltage output from the PFC circuit 18.

According to one embodiment, the first feedback module 12 and the second feedback module 13 may sample the output current of the power converter through two sampling circuits. As shown in FIG. 8, the first feedback module 12 samples the output current of the power converter 11 through a resistor R1 which is connected in series with the output terminal of the power converter 11, and the second feedback module 13 detects the output current of the power converter 11 through a resistor R2 which is connected in series with the output terminal of the power converter 11 and the resistor R1.

Rather, the first feedback module 12 and the second feedback module 13 may detect the output current through other manners, and the present disclosure does not impose specific limitations on this.

Although it is not shown in figures, the embodiments as shown in FIGS. 2 to 7 of the present disclosure may also include the PFC circuit 18 and the bus capacitor 19.

Although the present disclosure has been described with reference to typical embodiments, it should be understood that the terminologies herein are for illustration purposes rather than to limit the present invention. The present disclosure can be implemented in many specific embodiments without departing from the spirit and scope of the present disclosure, and thus it shall be appreciated that the above embodiments shall not be limited to any details described above, but shall be interpreted broadly within the spirit and scope defined by the appended claims. The appended claims intend to cover all the modifications and changes falling within the scope of the appended claims and equivalents thereof.

What is claimed is:
1. A power circuit applied in a LED load, comprising:
a power converter configured to receive an input voltage and convert the input voltage into a DC output voltage;
a first feedback module electrically coupled to an output terminal of the power converter, and configured to detect the DC output voltage and an output current of the power converter and to output a first feedback signal;
a second feedback module electrically coupled to the output terminal of the power converter, and configured to detect the DC output voltage and the output current of the power converter and to output a second feedback signal, wherein the second feedback module and the first feedback module are independent to each other; and
a control circuit electrically coupled to the first feedback module, the second feedback module and the power converter, wherein the control circuit is configured to output a control signal according to the first feedback signal or the second feedback signal, so as to control the power converter on the basis of the control signal and make an output power of the power converter smaller than a predetermined power threshold;
wherein the first feedback module comprises:
a first current control unit configured to detect the output current of the power converter, compare the output current with a preset output current reference, and output a current control signal; and
a first voltage control unit configured to detect the DC output voltage of the power converter, compare the DC output voltage with a preset output voltage reference, and output a voltage control signal;
wherein the first feedback module outputs the first feedback signal according to the current control signal and the voltage control signal;
wherein the second feedback module comprises:
a second current control unit configured to detect the output current of the power converter, compare the output current with a preset output current reference, and output a current control signal; and
a second voltage control unit configured to detect the DC output voltage of the power converter, compare the DC output voltage with a preset output voltage reference, and output a voltage control signal;
wherein the second feedback module outputs the second feedback signal according to the current control signal and the voltage control signal;
wherein if any one of the first and second feedback modules has a failure, the other one of the first and second feedback modules controls current and voltage of the power converter so as to control the output power of the power converter;
wherein the first current control unit is a constant current feedback unit or an overcurrent protection unit, and the first voltage control unit is a constant voltage feedback unit or an overvoltage protection unit;
wherein the second current control unit is a constant current feedback unit or an overcurrent protection unit, and the second voltage control unit is a constant voltage feedback unit or an overvoltage protection unit.

2. The power circuit according to claim 1, further comprising a signal transmission circuit and a primary side control circuit,
wherein the signal transmission circuit is electrically coupled to the first feedback module, the second feedback module and the control circuit, and is configured to transmit the first feedback signal or the second feedback signal to the control circuit, when a fault occurs in the signal transmission circuit, the primary side control circuit performs an overvoltage protection or an overcurrent protection on the power circuit.

3. The power circuit according to claim 2, wherein the signal transmission circuit is an optocoupler.

4. The power circuit according to claim 2, wherein the primary side control circuit is a primary side overcurrent protection circuit or a primary side overvoltage protection circuit.

5. The power circuit according to claim 1, further comprising a first signal transmission circuit and a second signal transmission circuit which are independent to each other;
wherein the first signal transmission circuit is electrically coupled to the first feedback module and configured to transmit the first feedback signal from the first feedback module to the control circuit, and the second signal transmission circuit is electrically coupled to the second feedback module and configured to transmit the second feedback signal from the second feedback module to the control circuit.

6. The power circuit according to claim 5, wherein both the first signal transmission circuit and the second signal transmission circuit are optocouplers.

7. The power circuit according to claim 1, further comprising a power factor correction (PFC) circuit and a bus capacitor,
wherein the power factor correction circuit is configured to receive an AC voltage and convert it into an intermediate voltage; and
wherein the bus capacitor is disposed between output terminals of the power factor correction circuit and input terminals of the power converter, and is configured to provide the input voltage according to the intermediate voltage.

8. The power circuit according to claim 1, wherein the predetermined power threshold is selected according to UL1310 Class 2 Standard.

9. The power circuit according to claim 1, wherein the power converter comprises an isolation transformer, and the control circuit is disposed at a primary side of the isolation transformer, and the first feedback module and the second feedback module are disposed at a secondary side of the isolation transformer.

* * * * *